United States Patent
Pfister

(10) Patent No.: US 10,451,524 B2
(45) Date of Patent: Oct. 22, 2019

(54) METHOD AND TEST STAND FOR TESTING AN ASSEMBLY OF COMPONENTS OF A VEHICLE

(71) Applicant: AVL LIST GMBH, Graz (AT)

(72) Inventor: Felix Pfister, Graz (AT)

(73) Assignee: AVL List GmbH, Graz (AT)

( * ) Notice: Subject to any disclaimer, the term of this patent is extended or adjusted under 35 U.S.C. 154(b) by 162 days.

(21) Appl. No.: 15/329,110

(22) PCT Filed: Jul. 24, 2015

(86) PCT No.: PCT/EP2015/066958
§ 371 (c)(1),
(2) Date: Jan. 25, 2017

(87) PCT Pub. No.: WO2016/012575
PCT Pub. Date: Jan. 28, 2016

(65) Prior Publication Data
US 2017/0336289 A1  Nov. 23, 2017

(30) Foreign Application Priority Data
Jul. 25, 2014 (AT) ............... A 50525/2014

(51) Int. Cl.
*G01M 17/007* (2006.01)
*G01M 13/025* (2019.01)
*G01M 13/027* (2019.01)

(52) U.S. Cl.
CPC ...... *G01M 17/0072* (2013.01); *G01M 13/025* (2013.01); *G01M 13/027* (2013.01); *G01M 17/007* (2013.01)

(58) Field of Classification Search
CPC .......... G01M 17/0072; G01M 13/027; G01M 17/007; G01M 13/025
(Continued)

(56) References Cited

U.S. PATENT DOCUMENTS 4,986,114 A * 1/1991 Rothmann ............ G01L 5/282
73/115.01
5,986,545 A  11/1999 Sanada et al.
(Continued)

FOREIGN PATENT DOCUMENTS

DE  102006035502     4/2008
DE  102006035502 B3 * 4/2008 .......... G01M 13/025
(Continued)

OTHER PUBLICATIONS

English Abstract of JPS6274757.
English Abstract of DE 102006035502.
English Abstract of EP 1382955.

*Primary Examiner* — Eunhee Kim
(74) *Attorney, Agent, or Firm* — Dykema Gossett PLLC

(57) ABSTRACT

In order to be able to test an assembly of components of a vehicle on a test stand with improved dynamics, it is provided to calculate, in a simulation unit (20) using a simulation model (21) for the at least one component of the assembly, the instantaneous drive train rotary speed ($n_P$) of this component from a drive train torque ($T_P$) acting in the drive train (2) and the braking effect (B) of the braking system (11), and the calculated instantaneous drive train rotary speed ($n_P$) is used by the vehicle control device (14) for calculating the at least one component, and the calculated drive train rotary speed ($n_P$) is used by a drive controller (23) for controlling the load machine (8).

13 Claims, 3 Drawing Sheets

Figure 1:
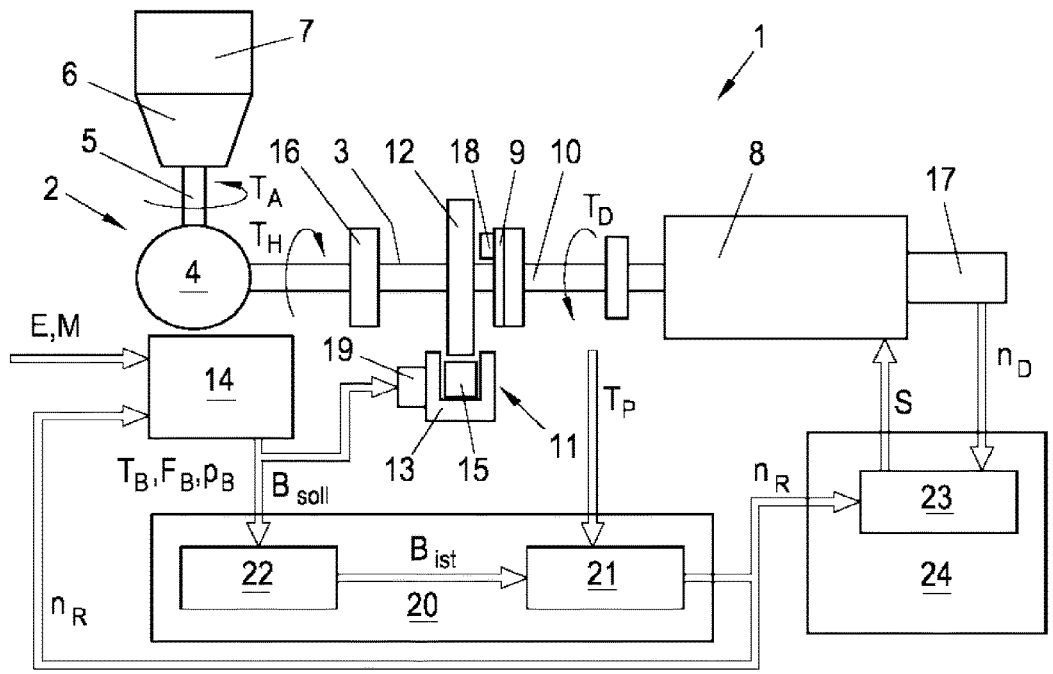

(58) Field of Classification Search
USPC ......................................................... 703/8, 6
See application file for complete search history.

(56) References Cited

U.S. PATENT DOCUMENTS

| | | | | |
|---|---|---|---|---|
| 6,098,007 | A * | 8/2000 | Fritz | B60K 31/047 |
| | | | | 701/70 |
| 7,315,804 | B2 * | 1/2008 | Sato | B60T 8/17551 |
| | | | | 700/286 |
| 7,680,639 | B2 * | 3/2010 | Schoeggl | G01M 17/007 |
| | | | | 434/66 |
| 8,631,693 | B2 * | 1/2014 | Johnson | G01M 17/0074 |
| | | | | 73/116.05 |
| 2010/0286880 | A1 | 11/2010 | Cahill et al. | |
| 2011/0191079 | A1 | 8/2011 | Rzehorska et al. | |
| 2016/0012163 | A1 * | 1/2016 | Kim | G06F 17/5095 |
| | | | | 703/8 |

FOREIGN PATENT DOCUMENTS

| | | |
|---|---|---|
| EP | 1382955 | 1/2004 |
| JP | S6274757 | 4/1987 |

\* cited by examiner

METHOD AND TEST STAND FOR TESTING AN ASSEMBLY OF COMPONENTS OF A VEHICLE

The subject invention relates to a method and a test stand for testing an assembly of components of a vehicle with at least one vehicle control device, that processes the rotary speed of a drive train, and a braking system, that acts on the drive train, on a test stand, wherein the drive train of the vehicle is driven by a drive unit and the drive train has applied thereto a load torque by a load machine associated therewith, and at least one component of the assembly is controlled by the vehicle control device as a function of the rotary speed of the drive train.

Vehicles include a plurality of vehicle control devices, such as for example a hybrid control device, an engine control device, a transmission control device, a dynamic stability control device etc., to mention but a few, which may be networked together via one or more vehicle bus(es). Many of these vehicle control devices process a rotary speed that is measured either on a vehicle wheel, for example by means of the ABS rotary speed sensors, or on a component of the drive train, for example on the transmission input or output, on a differential gear, on the output of an electric motor in a hybrid drive train. A typical example of such a vehicle control device in a vehicle is the dynamic stability control system that processes a rotary speed of a vehicle wheel, or usually rotary speeds of all of the vehicle wheels, for controlling a braking system of the vehicle.

Dynamic stability control (DSC) is generally understood to be an electronically controlled vehicle assistance system for motor vehicles which counteracts, by way of a targeted deceleration of individual wheels, breaking away of the vehicle or generally provides a contribution to driving safety and driving comfort. Dynamic stability controllers are an extension and a combination of the known braking system with anti-lock braking system (ABS) and anti-slip control (ASR) and an electronic brake force distribution. To this end, also a brake assistant or the handbrake may be combined. Hereinbelow, the term dynamic stability control system (DSC) will be used for this purpose. The term dynamic stability control system is therefore broader than a braking system, but it includes the braking system.

There are different approaches to developing and testing dynamic stability control systems (DSC). To start with, there is usually a pure simulation of the braking system as part of the dynamic stability control system (DSC). The braking system control unit is then often developed further or tested in a so-called hardware-in-the-loop (HiL) test stand. In the course of this, the brake hardware is simulated using models and the braking system control unit is developed or further developed using this simulation. Thus, different functionalities of the braking system control unit, such as e.g. ABS, ASR, Hill-Holder, handbrake, etc. may be developed and tested. Further, so far real braking systems built into real vehicles have been tested, e.g. on a test track on which the vehicle is moved in reality, or on a roller test stand. However, real test drives are on the one hand expensive and are on the other hand hardly reproducible.

The same essentially also applies to other control units of the vehicle, even if the invention will be explained below by way of the specific example of a dynamic stability control system.

US 2010/0286880 A1 discloses a method for checking the function of a braking system of a vehicle, wherein a wheel speed is simulated in the form of a speed-time profile. The speed profile is specified to the braking system, and the response thereof is checked. Thus, however, no closed-loop test run can be realized under real conditions of a braking system and a drive train, but only an open-loop function test is realized.

DE 10 2006 035 502 B3 describes a method for checking the behaviour of a drive train connected to a load machine by means of a cardan shaft for simulating a wheel of a vehicle. To this end, a vehicle model, a tire model and a brake model are implemented in a simulation device. From this, the simulation device determines a setpoint torque, by which the load machine is controlled. A dynamic stability control system detects, via a rotary speed sensor, the rotary speed of the wheel (which corresponds, in a first approximation, to the rotary speed of the load machine) and determines therefrom a braking pressure that is converted in the simulation device by means of the braking model into a braking torque that is incorporated in the setpoint torque. In this way, the correct functioning of the braking system of the wheel simulated by the load machine can be checked.

The problem here is the braking forces, which in many braking maneuvers may be very high, and the very high rates of change of the braking forces or of the braking torques and the highly dynamic tire forces of the vehicle, as well as the concomitant very high acceleration and acceleration gradients. Many braking maneuvers are therefore subject to high dynamics, which can usually not be simulated on test stands. The term "dynamics" is here generally understood to mean how quickly it is possible to respond to changes to the setpoint value of the rotary speed, rotary acceleration or a rotary torque, i.e. how quickly a new setpoint value can be adjusted. The desired high dynamics is opposed to a limited transmission behaviour (i.e. limited change rates) of the test stand, consisting of control systems, measurement systems, simulation systems and actuators, so that highly dynamic braking processes or a highly accurate adjustment of the rotary speeds resulting from the braking pressure behaviour cannot, or only insufficiently, be realized using a conventional test stand design. The actual rotary speed of the load machine (dynamometer, dyno) is used, as described above, as an input into the dynamic stability control system. The rotary acceleration is limited in the dynamics by the test stand cardan shaft (the shaft between the load machine and the vehicle axis or the vehicle wheel), and by the performance rating of the load machine (rotary torque, rotary speed), as well as by the deceleration times of the above-mentioned system components of the test stand. Thus, highly dynamic braking operations can only insufficiently be simulated and tested using a conventional test stand design, as described in DE 10 2006 035 502 B3.

In general, it can be said that due to the limited dynamics of the test stand, highly dynamic test runs on a drive train or a vehicle, in particular those that effect an intervention by the braking system, are possible only to a limited extent, and such test runs can therefore be simulated and tested only to an insufficient degree.

It is therefore an object of the subject invention to provide an improved method and a corresponding test stand for testing an assembly of components of a vehicle with at least one vehicle control unit, which can be carried out with improved dynamics.

According to the invention, this object is achieved by calculating, in a simulation unit, by means of a simulation model for the at least one component of the assembly, the instantaneous drive train rotary speed of this component from a drive train torque acting in the drive train and a braking effect of the braking system and to use the calculated instantaneous drive train rotary speed from the vehicle control device for controlling the at least one component, and the calculated drive train rotary speed from a drive controller is used for controlling the load machine. The vehicle control device of the assembly of components to be tested thus does not work with the rotary speed measured in the drive train on the test stand, but with a rotary speed calculated in a simulation. As a result of this approach, the dynamics of the vehicle control device is largely separated from the dynamics of the test stand. The vehicle control device "sees" the simulated, i.e. the highly dynamic calculated rotary speed, rather than the rotary speed of the drive train as measured on the test stand with—in particular in the case of highly dynamic braking processes—delayed dynamics, and can correspondingly react on the test stand with high dynamics on rotary speed changes with high change rates in the drive train, in particular caused by highly dynamic braking operations/dynamic stability control processes. The fact that the load machine (and thus the drive train) cannot always follow the extremely highly dynamic rotary speed changes on the test stand sufficiently quickly and that during highly dynamic control operations the actual rotary speed realized on the test stand temporarily deviates from the one simulated, is here secondary. The exact tracking of the rotary speed of the drive train is secondary for the test, i.e. for the evaluation of the braking behaviour. In this way, the assembly of the components of the vehicle may be tested under substantially more realistic conditions.

Particularly advantageously, the method according to the invention can be applied if the vehicle control device is a dynamic stability control system, and the instantaneous rotary speed of the vehicle wheel is calculated in the simulation unit by means of a simulation model for a vehicle wheel from a drive train torque acting in the drive train and a braking effect of the braking system, and the calculated rotary speed is used by the driving dynamics control system for controlling the braking system, and the calculated rotary speed is moreover used by a drive controller for controlling the load machine. In this embodiment, the braking system is at the same time generated by the dynamic stability control system, i.e. the vehicle control device in the assembly to be tested.

Of course, in this way, as in a real vehicle, also all of the braking systems connected to the drive train, usually one braking system for each vehicle wheel, may be tested in this way in combination with the dynamic stability control system.

The required braking effect may here be calculated in the simulation unit by means of a braking simulation model for the braking system or may be measured on the test stand or may also be provided by the dynamic stability control system itself. To this end, the braking torque may be actually provided by the real braking actuators (pneumatic or hydraulic) from the test stand.

In the same way, the test may advantageously be carried out on a roller test stand, wherein the load torque resulting from the tire and the brake is applied onto the drive train via a roller on which a vehicle wheel is arranged. Thus, also the tire-road surface behaviour can be simulated in a more realistic manner, which makes the test altogether more realistic.

On the test stand, the braking system may comprise a first brake portion and a second brake portion that interacts with the former and that is mechanically connected to the drive train. In this case a braking moment is really generated by the braking system from the specified braking effect (i.e. the braking force or the braking pressure) and is applied onto a drive train on the test stand. This allows tests to be carried out under very realistic braking effects.

On the test stand, the braking system may comprise a first brake portion and a second brake portion that is mechanically connected to the drive train, wherein the first brake portion is mechanically separated from the second brake portion by means of the fact that the first brake portion acts on a dummy brake portion. Thus, no braking torque is applied onto the drive train by the braking system by the decoupling of the brake portions on the test stand. The developing braking effect (e.g. the braking torque) may be calculated in a simulation unit. The braking effect of the braking system can here be indirectly simulated via the resulting calculated rotary speed and the load machine, as it occurs on the basis of the balancing of all torques. The carrying out of tests is here particularly advantageous because only the resulting torque, that brakes the drive train, has to really be applied by the load machine. In addition, it readily allows, provided suitable simulation models are provided, testing of different braking systems.

In a further embodiment, the braking system is provided only as a simulation in a simulation unit and the acting braking effect is calculated on the basis of the simulation.

Figure 2:
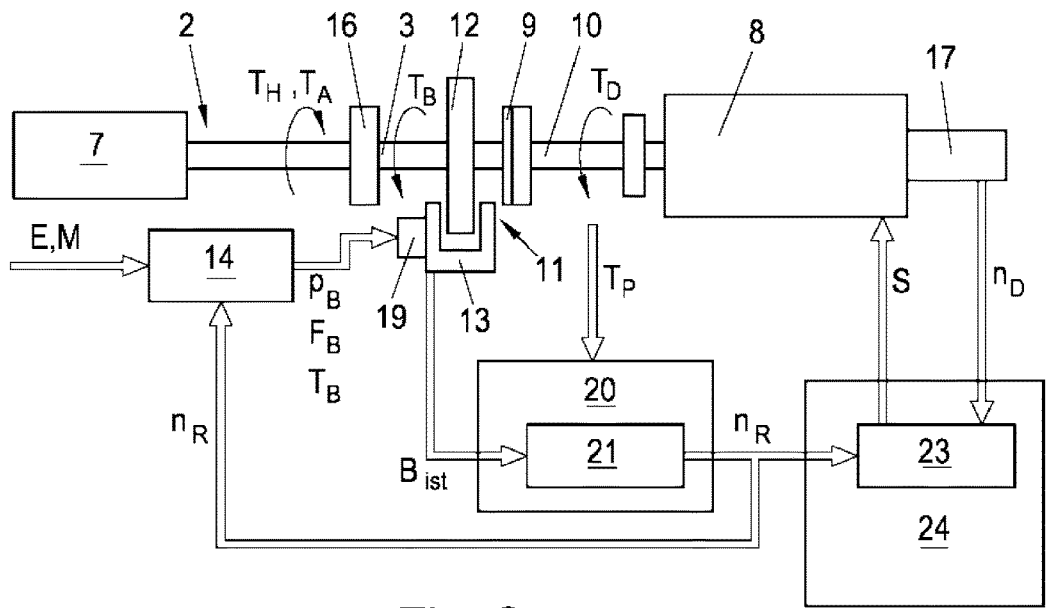
Figure 3:
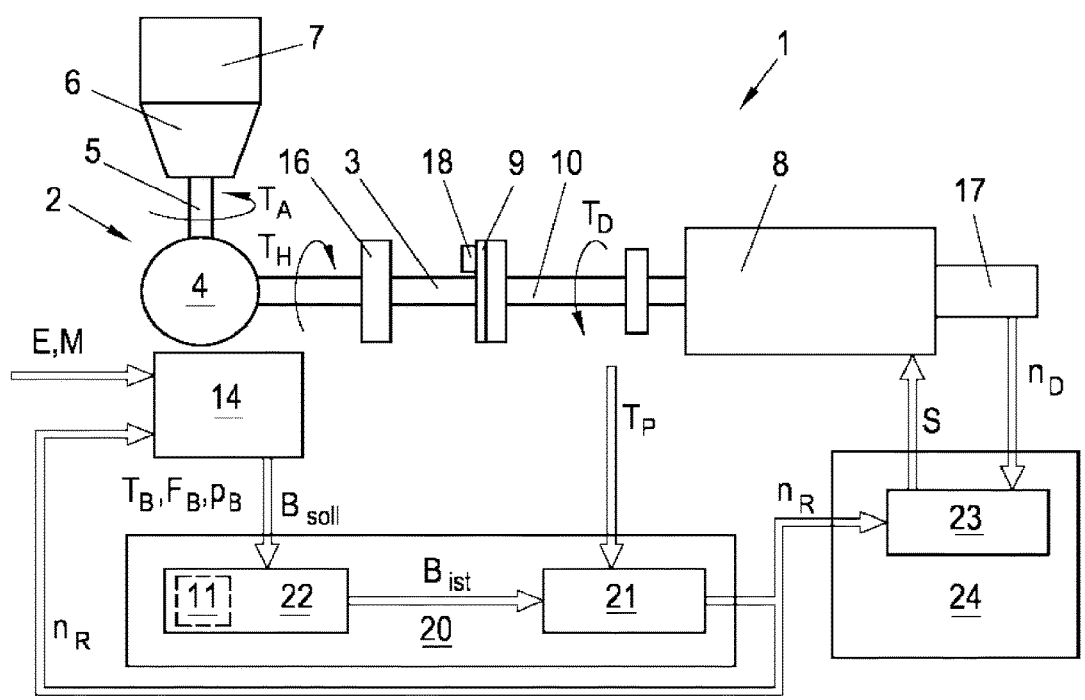
Figure 4:
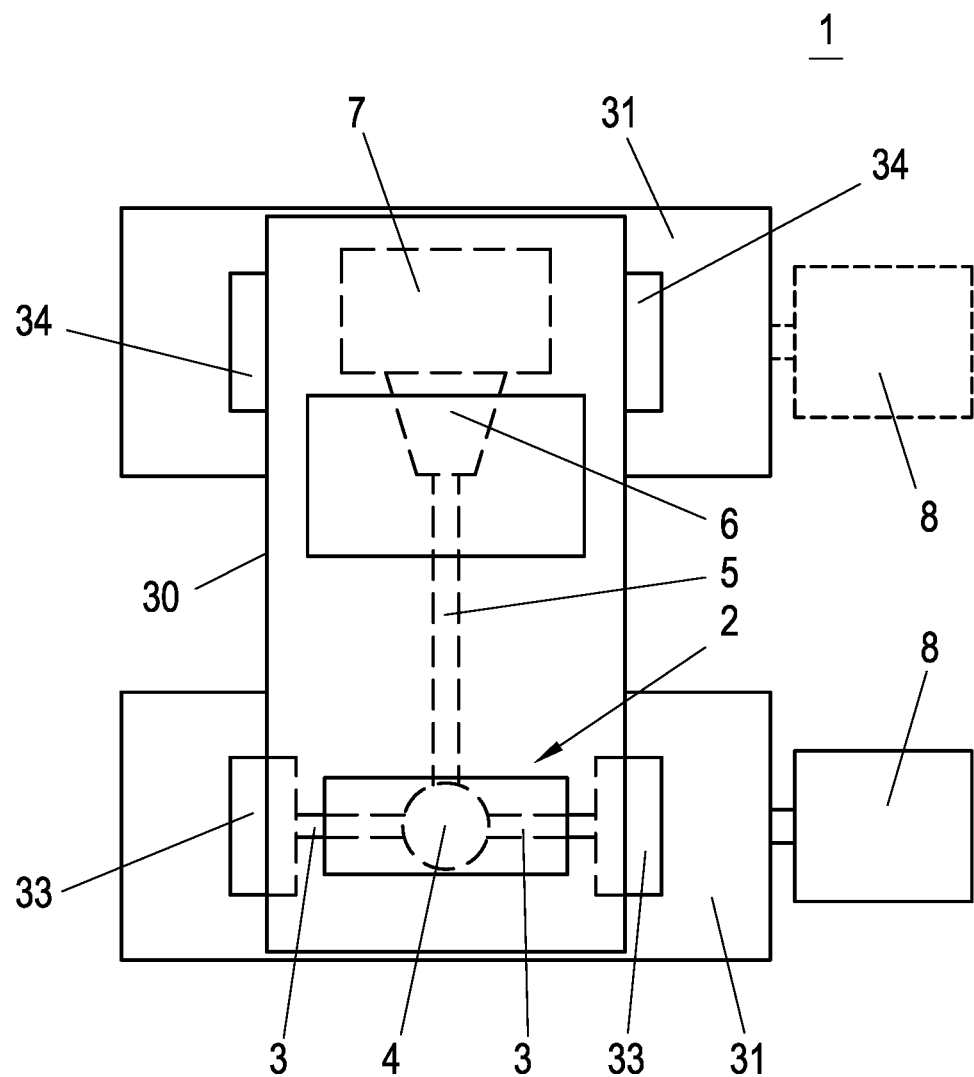

The subject invention will be explained in more detail below with reference to FIGS. 1 to 4, which show by way of example, schematically and in a non-limiting manner, advantageous embodiments. In the figures FIG. 1 shows a schematic view of the configuration of the test stand for testing an assembly of components of a vehicle with a dynamic stability control system as the vehicle control device, FIG. 2 shows a further advantageous configuration of the test stand, FIG. 3 shows a further advantageous configuration of the test stand, and FIG. 4 shows a roller test stand for carrying out a test on an assembly of components of a vehicle.

FIG. 1 shows a schematic view of a drive train test stand as a test stand 1, with a drive train 2 of a vehicle, which comprises here a side shaft 3, a differential gear 4, a drive shaft 5 and a transmission 6 as real components which are functionally set up on the test stand 1. The drive train 2 is driven by a drive unit 7, such as for example an internal combustion engine or an electric motor, and generates a drive torque $T_A$ that results in a side shaft torque $T_H$. Generally speaking, reference will be made hereinbelow to a drive train torque $T_P$ which generally designates a torque acting in the drive train 2. The drive train 2 is connected to a load machine 8, preferably an electric load machine (dyno). To this end, the load machine 8 is connected in a rotationally fixed manner to the vehicle wheel 9, of which here for the sake of simplicity only the wheel hub is shown, if necessary via a suitable load shaft 10, for example a cardan shaft. The load machine 8 generates a load torque $T_D$ that is applied onto the drive train 2. Due to the acting torques, various rotary speeds occur in the components of the drive train, such as for example a rotary speed $n_R$ of the vehicle wheel 9 or a rotary speed at the output of the differential gear 4. In general, reference is made below to a drive train rotary speed $n_P$ which generally designates a rotary speed acting in the drive train 2.

In a real vehicle, also a braking system 11 having a first brake portion 13 and a second brake portion 12 is provided in order to brake the vehicle wheel 9 and thus also the vehicle. Such a braking system 11 is also set up on the test stand 1. To this end, a second brake portion 12, such as for example a brake disc, a brake drum or the like, is mechanically connected in a rotationally fixed manner to the drive train 2, usually with a side shaft 3 and/or the vehicle wheel 9. The first brake portion 13, such as a brake calliper or brake shoes with brake pads, interacts in a known manner with the second brake portion 12 for dissipative braking. The first brake portion 13 of the brake system 11 further comprises, in a known manner, an actuating unit 19 such as for example a hydraulic or pneumatic unit, in order to press, for generating a brake effect B, an element of the first brake portion 13 against the second brake portion 12. The braking system 11 generates, during a braking operation as a result of the instantaneous braking pressure $p_B$ generated by the braking system 11 or the generated instantaneous braking force $F_B$, a braking torque $T_B$ that brakes the actually present drive train 2 and thus also virtually the vehicle. Generally speaking, the term braking effect B will be used hereinbelow for the equivalent variables of braking pressure $p_B$, braking force $F_B$ and braking torque $T_B$.

Individual components of the drive train 2 are controlled here in a known manner by a vehicle control device 14 as a function of a drive train rotary speed $n_P$ and, if necessary, further measurement variables M and input variables E. For example, the brake system 11 is mentioned here, which is controlled in the vehicle, and also on the test stand 1, by a dynamic stability control system 14 as a function of a rotary speed $n_R$ of the vehicle wheel 9. To this end, the dynamic stability control system 14 specifies, as a function of various measurement variables M and input variables E of the actuating unit 19 of the braking system 11, a setpoint braking effect $B_{soll}$ that is to be adjusted by the braking system 11. Another example is a hybrid control device that controls an electric motor of the drive train 2 as a function of a drive train rotary speed $n_P$ and, if necessary, of further measurement variables M and input variables E. In general, reference is made hereinbelow to a vehicle control device 14 which in general designates a control device present in the vehicle for controlling the component of the vehicle or of the drive train 2 as a function of a drive train rotary speed $n_P$ and, if necessary, of further measurement variables M and input variables E.

In a real vehicle, for example the vehicle control device 14 would receive the rotary speeds of the vehicle wheels 9 as measurement variable M from the wheel rotary speed sensors 18 integrated as standard, and would if necessary receive from other integrated sensors further measurement variables M of the vehicle, such as for example longitudinal acceleration, transverse acceleration, yaw rates, the steering angle, the steering angular speed, etc. Also, the vehicle control device 14 would process further input variables E, such as for example a brake pedal signal. From these variables, for example a dynamic stability control system calculates a setpoint braking pressure $p_B$ or a setpoint braking force $F_B$ (equivalently also a setpoint braking torque $T_B$), i.e. a target braking effect $B_{soll}$ for the braking system 11, which is then used to control the first brake portion 13 via the actuating unit 19.

This assembly of components of the vehicle consisting of a drive train 2 with the drive unit 7, a braking system 11 acting on the drive train 2 and a vehicle control device 14 is to be tested on the test stand 1 under the effect of the braking system 11, wherein the load machine 8 applies a load torque $T_D$ onto the drive train 2. This will be described in more detail below by way of the specific example of a dynamic stability control system as the vehicle control device 14.

In order to test the vehicle control device 14, for example the dynamic stability control system, on a test stand 1, it is provided in a first embodiment according to the invention according to FIG. 1, that the first brake portion 13 and the second brake portion 12 are mechanically separated and that the first brake portion 13 acts on a passive dummy brake portion 15, such as for example a dummy brake disc or a dummy brake drum. Thus, in the case of a braking operation on the test stand 1, no real braking torque $T_B$ is applied onto the drive train 2 by the braking system 11.

In a simulation unit 20, a simulation model 21 for simulating the vehicle wheel 9 (possibly also of the vehicle and/or of the tire) is implemented, which simulates the real behaviour of the vehicle wheel 9, and possibly of the vehicle and/or of the tire. The simulation model 21 now calculates the instantaneous rotary speed $n_R$ of the vehicle wheel 9 (as the drive train rotary speed $n_P$) from the drive train torque $T_P$ currently acting in the drive train 2, i.e. for example the side shaft torque $T_H$ and/or the drive torque $T_A$ as measured by means of the torque measurement sensor 16, and the instantaneous braking effect $B_{ist}$, such as for example the instantaneous braking torque $T_B$ resulting from the specified setpoint braking pressure $p_B$ or the setpoint braking force $F_B$. Also, further torques, such as for example a tire torque from a tire model, or further variables, such as for example a resistance torque from an aerodynamic model, may be taken into account in the simulation model 21. Also, the dynamic stability control system, like in a real vehicle, can of course also take into account measurement variables M of the vehicle or input variables E, which may originate either from real sensors, from simulations using models or from a higher-level control unit, for example the test stand control unit 24. The instantaneous braking effect $B_{ist}$ can be measured using suitable sensors, e.g. by measuring the actual braking force $F_{B\_ist}$ on the dummy brake portion 15, or may also be calculated using a brake simulation model 22 of the braking system 11, as indicated in FIG. 1. The brake simulation model 22 calculates for example the instantaneous braking torque $T_{B\_ist}$, or generally the instantaneous braking effect $B_{ist}$, using the setpoint braking pressure $p_B$ specified in the dynamic stability control system or the specified setpoint braking force $F_B$. The instantaneous braking effect $B_{ist}$ may also be supplied via suitable interfaces by the dynamic stability control system, in this case for example as setpoint braking torque $T_B$, which however may be sufficiently accurate for testing the dynamic stability control system.

The thus calculated rotary speed $n_R$ of the vehicle wheel 9 is then communicated directly to the dynamic stability control system and, independently thereof, also to a drive controller 23 for the load machine 8 that is implemented for example in a test stand control unit 24. The drive controller 23 translates the calculated rotary speed $n_R$ into a control signal S such as for example a setpoint rotary torque for the load machine 8, in order to adjust the calculated rotary speed $n_R$ via the load torque $T_D$ of the load machine 8 in the drive train 2. To this end it may also be provided for the current rotary speed $n_D$ of the load machine 8 to be measured using a rotary speed measuring unit 17 and to be communicated to the drive controller 23.

In this way, the dynamic stability control system, or generally the vehicle control device 14, does not receive the actually present rotary speed $n_R$ of the vehicle wheel 9 which is limited in terms of its dynamics, which could for example be measured by means of the integrated wheel rotary speed sensors (ABS sensors) 18, or in general the actually present drive train rotary speed $n_P$ which is limited in terms of its dynamics, but a highly dynamic, calculated rotary speed $n_R$, or generally $n_P$. Thus, the simulated rotary speed $n_R$, in particular in the case of highly dynamic braking operations, deviates from the actual rotary speed on the test stand 1. Or in other words, the actual rotary speed in the drive train 2 lags behind the highly dynamic simulated rotary speed $n_R$ due to the limited dynamics of the test stand 1 and the components thereof, because the calculated rotary speed $n_R$ cannot sufficiently quickly be adjusted on the test stand 1 via the load machine 8, which is however irrelevant for the test of the dynamic stability control system. Thus it is possible to test the assembly of components using the dynamic stability control system, or generally using the vehicle control device 14, and the braking system 11 on the test stand 1 under even more realistic conditions.

Although the invention has been described above only for a semi-axle of the vehicle, it is a matter of course that all of the braking systems 11 on all of the axles and/or semi-axles may be tested in this way, also simultaneously, under the effect of the vehicle control device 14, in particular also non-driven axles of the vehicle. It is known that on a typical drive train test stand, in many cases all of the vehicle wheels 9 or at least all of the driven vehicle wheels 9 of a vehicle are connected to a load machine 8. In this situation, the simulation model 21 of the vehicle wheel in the simulation unit 20 is used to calculate the rotary speeds $n_R$ of all the considered vehicle wheels 9 and to communicate them to the vehicle control device 14 and the respective drive controllers 23 of the associated load machines 8 associated with the vehicle wheels 9. In this way it is possible to test, using a dynamic stability control system as the vehicle control 14, stability cases of the vehicle, such as for example ABS (anti-lock braking system) or ASR (anti-slip control) interventions in a very realistic manner.

It is also to be pointed out that not only the functions of a service brake of a vehicle, but in the same way also the functions of a parking brake may be considered in the tests.

In a second possible embodiment of the invention according to FIG. 2, the braking system 11 is set up on a test stand 1 like in a vehicle, i.e. that for dissipative braking the first brake portion 13 interacts with the second brake portion 12, which is again mechanically connected to the drive train 2 in a rotationally fixed manner. This means here that during a braking operation, a braking torque $T_B$ is actually applied onto the drive train 2. Accordingly, the braking effect B of the brake system 11 does not need to be simulated in a simulation unit 22 but can be directly measured as an instantaneous braking effect $B_{ist}$. Consequently, the brake simulation model 22 of the simulation unit 20 may be omitted. Nevertheless, however, also a brake simulation module 22 may be implemented in order to calculate the instantaneous braking effect $B_{ist}$, for example if the instantaneous braking effect $B_{ist}$ can be measured either not directly or only with difficulties. Otherwise, what was mentioned with reference to FIG. 1 applies here as well.

In a third possible embodiment, the braking system 11 is not really set up at all, i.e. neither the first brake portion 13 nor the second brake portion 12 nor the actuating unit 19 is actually present. The braking system 11 is here completely, or partially, simulated by the brake simulation model 22 of the simulation unit 20 and is replaced with the simulation as indicated in FIG. 3. Thus, the dynamic stability control system as the exemplary vehicle control unit 14 controls a simulation of the braking system 11, which is however irrelevant for testing the dynamic stability control system in accordance with the inventive method.

It is also conceivable to test the vehicle control device 14 of a vehicle 30 using the braking system 11 not on a drive train test stand but on a roller test stand as the test stand 1, as shown in FIG. 4. To this end, the vehicle 30 is, as is known, placed on a roller 31 at least with the driven vehicle wheels 33 provided at the end of the drive train 2 on the associated wheel hubs. The roller 31 is connected to a load machine 8 and is driven thereby. Here, the drive train 2 is thus connected to the load machine 8 via the roller 31, which load machine applies, via the roller 31, a load torque $T_D$ onto the drive train 2. The rotary speed $n_R$ of the wheel hub 9 corresponds here to the rotary speed of the vehicle wheel 33, 34. For the testing of the vehicle control device 14 in conjunction with a vehicle 30, however, it is advantageous when also non-driven vehicle wheels 34, for example on the front axle of the vehicle 30, are placed on a roller 31 driven in this way. It would also be conceivable to provide for each vehicle wheel 33, 34 its own driven roller 31 (individual wheel drive) or to place only one rotating wheel on a roller 31 (a so-called corner module). The testing of the vehicle control device 14 of the vehicle 30 is then carried out either as described above with reference to FIG. 1 to FIG. 3, with the vehicle control device 14 again receiving only calculated, highly dynamic rotary speeds $n_R$ rather than rotary speeds that are actually present on the test stand.

The example of the dynamic stability control system as the vehicle control device 14 is a special case insofar as the dynamic stability control system itself calculates the braking effect $B_{soll}$ for controlling the braking system 11, by means of which the dynamic stability control system controls the braking system 11 as a component of the assembly. If the assembly of the components to be tested under the effect of the braking system 11 comprises another vehicle control device 14 that controls a component other than the braking system 11, it is necessary for the test to control the braking system 11 as well. The braking effect $B_{soll}$ necessary for this purpose for controlling the braking system 11 may here come from an additionally present dynamic stability control system, but it may also be provided by another control unit, for example the test stand control unit 24, or even by an actually present brake pedal that is actuated by an operator. However, in the same way of course also the embodiments of the brake system 11 as explained above are possible. Thus, also the cooperation of several vehicle control devices 14 may be tested in the assembly of the components.

The invention claimed is:

1. A method for testing an assembly of components of a vehicle having a drive train, the method comprising:
   driving the drive train of the vehicle by a drive unit;
   applying a load torque to the drive train by a load machine connected thereto;
   controlling at least one component of the assembly by at least one vehicle control device as a function of a drive train rotary speed;
   calculating, in a simulation unit, an instantaneous drive train rotary speed of the at least one component of the assembly using a simulation model for the at least one component from a drive train torque acting on the drive train and from a braking effect of a braking system that acts on the drive train;
   controlling the at least one component, via the at least one vehicle control device, using the calculated instantaneous drive train rotary speed; and
   controlling the load machine, via a drive controller, using the calculated instantaneous drive train rotary speed.

2. The method of claim 1, further including
   controlling the braking system, utilizing a dynamic stability control system as the vehicle control device, as a function of the rotary speed of a vehicle wheel;

calculating, in the simulation unit, the instantaneous rotary speed of the vehicle wheel using a simulation model for the vehicle wheel;

controlling the braking system, via the dynamic stability control system, by utilizing the calculated instantaneous rotary speed of the vehicle wheel; and controlling the load machine, via the drive controller, using the calculated rotary speed of the vehicle wheel.

3. The method of claim 1, wherein the braking effect is calculated in the simulation unit using a brake simulation model for the braking system.

4. The method of claim 1, wherein the braking effect of the braking system is measured on the test stand.

5. The method of claim 2, wherein the braking effect is provided by the dynamic stability control system.

6. The method of claim 1, wherein the simulation model is also used to simulate the vehicle and/or a tire of the vehicle wheel.

7. The method of claim 1, wherein the load torque is applied onto the drive train via a roller, on which a vehicle wheel is arranged.

8. A test stand for testing an assembly of components of a vehicle, the test stand comprising:
   a drive train;
   at least one vehicle control device configured and arranged to
     process a drive train rotary speed, and
     control at least one component of the assembly as a function of the drive train rotary speed;
   a braking system configured and arranged to act on the drive train;
   a drive unit configured and arranged to drive the drive train;
   a load machine connected to the drive train and configured and arranged to apply a load torque onto the drive train;
   a simulation unit with a simulation model for the at least one component, the simulation unit configured and arranged to calculate an instantaneous drive train rotary speed from a drive train torque acting on the drive train, and from a braking effect of the braking system;

wherein the vehicle control device is further configured and arranged to control the at least one component using the calculated drive train rotary speed; and a drive controller configured and arranged to control the load machine using the calculated drive train rotary speed.

9. The test stand of claim 8, the test stand further including
   a dynamic stability control system configured and arranged to control the braking system as a function of a rotary speed of a vehicle wheel; and
   wherein the simulation unit is further configured and arranged to calculate the instantaneous rotary speed of the vehicle wheel; and
   wherein the dynamic stability control system is further configured and arranged to control the braking system using the calculated rotary speed of the vehicle wheel; and
   wherein the drive controller is further configured and arranged to control the load machine using the calculated rotary speed of the vehicle wheel.

10. The test stand of claim 8, wherein the braking system comprises a first brake portion and an interacting second brake portion that is mechanically connected to the drive train.

11. The test stand of claim 8, wherein
   the brake system includes a first brake portion and a second brake portion that is mechanically connected to the drive train; and
   wherein the first brake portion is mechanically separated from the second brake portion, by way of the first brake portion acting on a dummy brake portion.

12. The test stand of claim 8, wherein a brake simulation model for simulating the brake system is implemented in the simulation unit.

13. The test stand of claim 8, wherein a brake simulation model for the brake system is implemented in the simulation unit and the simulation unit calculates the braking effect therefrom.

* * * * *